United States Patent
Xu et al.

(10) Patent No.: US 11,903,033 B2
(45) Date of Patent: Feb. 13, 2024

(54) RANDOM ACCESS METHOD AND COMMUNICATION DEVICE

(71) Applicant: GUANGDONG OPPO MOBILE TELECOMMUNICATIONS CORP., LTD., Dongguan (CN)

(72) Inventors: Weijie Xu, Dongguan (CN); Xin You, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/155,827

(22) Filed: Jan. 22, 2021

(65) Prior Publication Data
US 2021/0144775 A1   May 13, 2021

Related U.S. Application Data

(63) Continuation of application No. PCT/CN2019/097655, filed on Jul. 25, 2019.

(30) Foreign Application Priority Data

Jul. 25, 2018   (CN) .......................... 201810827523.1

(51) Int. Cl.
*H04W 74/08* (2009.01)
*H04L 25/03* (2006.01)

(52) U.S. Cl.
CPC ... *H04W 74/0833* (2013.01); *H04L 25/03866* (2013.01)

(58) Field of Classification Search
CPC .................. H04W 74/0833; H04L 25/03866
See application file for complete search history.

(56) References Cited

U.S. PATENT DOCUMENTS 9,674,871 B2    6/2017  Lee et al.
10,999,873 B2 * 5/2021  Liu .................. H04W 74/0833
(Continued)

FOREIGN PATENT DOCUMENTS

CN    102932917 A    2/2013
CN    105230107 A    1/2016
(Continued)

OTHER PUBLICATIONS

PCT Written Opinion of The International Searching Authority issued in corresponding International Application No. PCT/CN2019/097655, dated Oct. 25, 2019, 6 pages.
(Continued)

*Primary Examiner* — Kevin M Cunningham
(74) *Attorney, Agent, or Firm* — BAYES PLLC (57) ABSTRACT

Disclosed are a random access method and a communication device. The method includes determining a first scrambling sequence according to at least one of a first random access preamble index or a first synchronization signal block index. The method also includes performing a first scrambling or descrambling process on a data channel in a first message in a random access procedure according to the first scrambling sequence. The first scrambling or descrambling process includes scrambling or descrambling performed on an encoded information bit on the data channel.

8 Claims, 3 Drawing Sheets

200

210 — Determine a first scrambling code sequence according to a first random access preamble identity and/or a first synchronization signal block index 220 — Perform a first scrambling or descrambling process on a data channel in a first message in a random access procedure according to the first scrambling code sequence, wherein the first scrambling or descrambling process includes scrambling or descrambling performed on an encoded information bit on the data channel (56) References Cited

U.S. PATENT DOCUMENTS

| | | | |
|---|---|---|---|
| 2009/0041240 A1* | 2/2009 | Parkvall | H04W 74/0833 380/247 |
| 2013/0028204 A1* | 1/2013 | Dinan | H04L 5/0098 370/329 |
| 2014/0133443 A1* | 5/2014 | Malladi | H04L 1/0061 370/329 |
| 2017/0019930 A1 | 1/2017 | Lee et al. | |
| 2017/0367120 A1* | 12/2017 | Murray | H04B 7/0695 |
| 2018/0041957 A1* | 2/2018 | Xiong | H04W 72/1268 |
| 2018/0124822 A1 | 5/2018 | Wang et al. | |
| 2018/0205515 A1 | 7/2018 | Wu et al. | |
| 2018/0205516 A1 | 7/2018 | Jung et al. | |
| 2018/0242367 A1* | 8/2018 | Kim | H04L 5/001 |
| 2018/0288676 A1* | 10/2018 | Wei | H04W 48/14 |
| 2018/0310329 A1* | 10/2018 | Yang | H04L 1/1607 |
| 2019/0110242 A1* | 4/2019 | Islam | H04J 11/0069 |
| 2021/0075574 A1* | 3/2021 | Jung | H04L 5/0051 |
| 2021/0337438 A1* | 10/2021 | Xiong | H04L 5/0051 |

FOREIGN PATENT DOCUMENTS

| | | |
|---|---|---|
| WO | 2017082950 A1 | 5/2017 |
| WO | 2017173883 A1 | 10/2017 |
| WO | 2020/020278 A1 | 1/2020 |

OTHER PUBLICATIONS

"Remaining details of RACH procedure", Agenda Item: 6.1.4.2, Source: ZTE, Sanechips, 3GPP TSG RAN WG1 Meeting #90bis, R1-1717036, Prague, Czech Republic, Oct. 9-13, 2017, 25 pages.

"Open issues for the Random access procedure", Agenda Item: 10.3.1.4.3, Source: Ericsson, 3GPP TSG-RAN WG2 #100, Tdoc R2-1713474, Reno, Nevada, USA, Nov. 27-Dec. 1, 2017, 11 pages.

"Remaining details on RACH procedure", Agenda Item: 6.1.4.2, Source: Ericsson, 3GPP TSG RAN WG1 NR Ad-Hoc#3, R1 1716155, Nagoya, Japan Sep. 18-21, 2017, 14 pages.

Extended European Search Report issued in corresponding European Application No. 19840285.1, dated Dec. 3, 2021, 10 pages.

First Office action issued in corresponding India Application No. 202117006161, dated Jan. 13, 2022, 5 pages.

First Office action issued in corresponding Canadian Application No. 3,107,529, dated Jan. 31, 2022, 4 pages.

"Remaining Details on RACH Procedure", Agenda 7.1.4.2, Source: Qualcomm Incorporated, 3GPP TSG-RAN WG1 Meeting #91, R1-1720653, Reno, Nevada, USA, Nov. 27-Dec. 2, 2017, 22 pages.

Priority Review issued in corresponding Chinese Application No. 202110176776.9, dated Jun. 28, 2022, 6 pages.

First Office Action issued in corresponding Chinese Application No. 202110176776.9, dated Jul. 26, 2022.

First Office Action issued in corresponding European Application No. 19840285.1, dated Aug. 4, 2022.

First Office Action issued in corresponding Taiwanese Application No. 108126437, dated Sep. 15, 2022.

Qualcomm Incorporated, "Design and evaluation of interleaver for Polar codes", R1-1713474, 3GPP TSG-RAN RAN1#90 Aug. 21-25, 2017 Prague, CZ.

CATT, "Consideration on 2-step RA", R2-1700205, 3GPP TSG RAN WG2 Meeting Ad Hoc Spokane, USA, Jan. 17-19, 2017.

Second Office Action issued in corresponding Chinese Application No. 202110176776.9, dated Oct. 28, 2022.

Second Office Action issued in corresponding Canadian Application No. 3,107,529, dated Nov. 23, 2022.

Second Office Action issued in corresponding European Application No. 19840285.1, dated Feb. 1, 2023.

* cited by examiner

RANDOM ACCESS METHOD AND COMMUNICATION DEVICE

CROSS-REFERENCE TO RELATED APPLICATIONS

This application is a continuation application of International Application No. PCT/CN2019/097655, filed on Jul. 25, 2019, which claims the benefit of priority to Chinese Application No. 201810827523.1, filed on Jul. 25, 2018, both of which are incorporated herein by reference in their entireties.

BACKGROUND

Embodiments of the present disclosure generally relate to communication technologies, and more particularly, to a random access method and a communication device.

After performing a cell search procedure, User Equipment (UE) can achieve downlink synchronization with a cell, and the UE can receive downlink data. The UE can only perform uplink transmission when the UE achieves uplink synchronization with the cell. The UE establishes a connection with the cell and obtains uplink synchronization through a Random Access procedure.

In the current random access procedure, the UE needs first to obtain a Temporary Cell Radio Network Temporary Identifier (TC-RNTI) assigned by a network device before sending a data channel, which is not conducive to shortening the delay of the random access procedure.

SUMMARY

Embodiments of the present disclosure provide a random access method and a communication device, which are conducive to shortening the delay of the random access procedure.

According to a first aspect, there is provided a random access method, including determining a first scrambling sequence according to a first random access preamble index and/or a first synchronization signal block index; and performing a first scrambling or descrambling process on a data channel in a first message in a random access procedure according to the first scrambling sequence, wherein the first scrambling or descrambling process includes scrambling or descrambling performed on an encoded information bit on the data channel.

According to a second aspect, there is provided a communication device configured to perform the method according to the first aspect or any implementation in the first aspect.

Specifically, the communication device includes functional modules configured to perform the method according to the first aspect or any implementation in the first aspect.

According to embodiments, the communication device is a terminal device or a network device.

According to a third aspect, there is provided a communication device, including a processor and a memory. The memory is configured to store a computer program, and the processor is configured to call and run the computer program stored in the memory to perform the method according to the first aspect or any implementation in the first aspect.

According to a fourth aspect, there is provided a chip configured to perform the method according to the first aspect or any implementation in the first aspect.

Specifically, the chip includes a processor configured to call and run a computer program from a memory, to cause a device installed with the chip to perform the method according to the first aspect or any implementation in the first aspect.

According to a fifth aspect, there is provided a computer-readable storage medium configured to store a computer program which causes a computer to perform the method according to the first aspect or any implementation in the first aspect.

According to a sixth aspect, there is provided a computer program product including computer program instructions which cause a computer to perform the method according to the first aspect or any implementation in the first aspect.

According to a seventh aspect, there is provided a computer program. When the computer program runs on a computer, the computer is caused to perform the method according to the first aspect or any implementation in the first aspect.

In the above technical solutions, the data channel can be carried in the first message in the random access procedure and scrambling or descrambling can be performed on the data channel based on the scrambling sequence generated according to the random access preamble index and/or synchronization signal block index obtained by the terminal device. Accordingly, the terminal device can put the information after the preamble sequence is sent in the first message and send the information together with the first message to the network device, which is beneficial to shorten the delay of the random access procedure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a 5G system, etc.

As an example, the communication system applied in embodiments of the present disclosure may include a network device, and the network device may be a device that communicates with a terminal device (or called a communication terminal or a terminal). The network device can provide communication coverage for a specific geographic area and can communicate with terminal devices in the coverage area. According to embodiments, the network device may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system applied in the embodiment of the present disclosure further includes at least one terminal device within the coverage area of the network device. The term "terminal device" as used herein includes but is not limited to UE, access terminal, user unit, user station, mobile station, mobile terminal, remote station, remote terminal, mobile device, user terminal, terminal, wireless communication device, user agent or user device. The access terminal can be a cellular phone, a cordless phone, a Session Initiation Protocol (SIP) phone, a Wireless Local Loop (WLL) station, a Personal Digital Assistant (PDA), or a handheld device with a wireless communication function, a computing device or other processing device connected to a wireless modem, an on-vehicle device, a wearable device, a terminal device in the future 5G network or a terminal device in a future evolved Public Land Mobile Network (PLMN), and so on, and embodiments of the present disclosure do not impose specific limitations on this.

According to embodiments, the 5G system or 5G network may also be referred to as a New Radio (NR) system or NR network.

Figure 1:
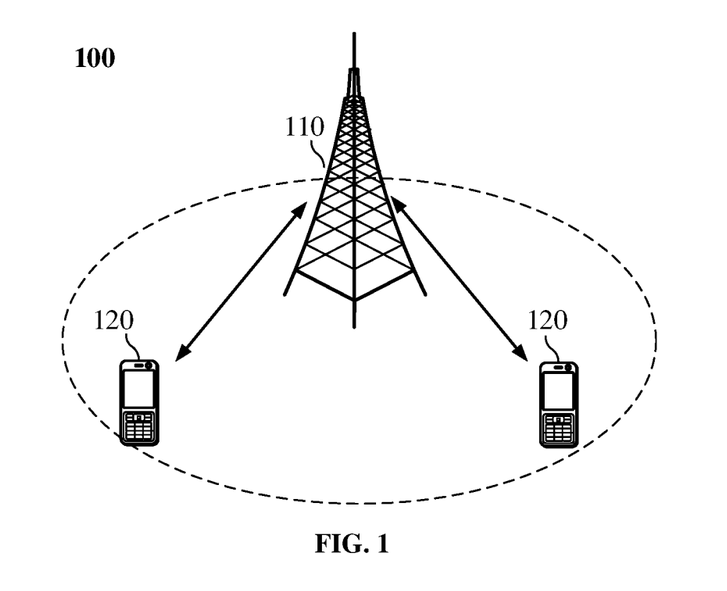
FIG. 1 is a schematic diagram of a communication system architecture according to an embodiment of the present disclosure.

FIG. 1 exemplarily shows one network device and two terminal devices. According to embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller or a mobility management entity, and embodiments of the present disclosure do not impose specific limitations on this.

It should be understood that a device with a communication function in a network/system in embodiments of the present disclosure may be referred to as a communication device. Taking the communication system 100 shown in FIG. 1 as an example, the communication device may include a network device 110 and a terminal device 120 with communication functions, and the network device 110 and the terminal device 120 may be the devices described above, which will not be repeated here. The communication device may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" describes an association relationship between associated objects, which means that there can be three relationships. For example, A and/or B can mean: A exists only, both A and B exist, or B exists only. In addition, the character "/" in generally indicates that the associated objects before and after "l" are in an "or" relationship.

The random access technology is the primary content for users to communicate with the network in a mobile communication system. In the wireless cellular network, a user initiates a connection request to the network side through a random access procedure. In the LTE system, the main purpose of random access is to establish uplink synchronization and receive the necessary Cell Radio Network Temporary Identifier (C-RNTI). Therefore, random access is not only used in initial access, but also in the case of user uplink synchronization loss.

In future wireless communication systems such as 5G, the trigger conditions for random access may include the following:

1. Initial Radio Resource Control (RRC) connection establishment: when a terminal device transits from an idle state to a connected state, the terminal device initiates random access.
2. RRC Connection Re-establishment: after the radio link fails, when the terminal device needs to re-establish the RRC connection, the UE will initiate random access.
3. When the terminal device performs handover, the terminal device initiates random access in the target cell.
4. When downlink data arrives: if the terminal device is in the connected state and the network device has downlink data that needs to be transmitted to the terminal device, but the terminal device is in an uplink out-of-synchronization state (the network device maintains an uplink timer; if the uplink timer expires and the network device does not receive the sounding signal from the terminal device, the network device considers the terminal device to be in the uplink out-of-synchronization state), the network device controls the terminal device to initiate random access.
5. When uplink data arrives: when the terminal device is in the connected state and the terminal device has uplink data that needs to be transmitted to the network device, but the terminal device finds itself in an uplink out-of-synchronization state (the network device maintains an uplink timer; if the uplink timer expires and the terminal device does not receive a command from the network device to adjust the timing advance (TA), the terminal device considers that the terminal device itself is in the uplink out-of-synchronization state), and the terminal device initiates random access.
6. When the terminal device is in the connected state and TA is required for positioning, the terminal device initiates random access.

Figure 2:
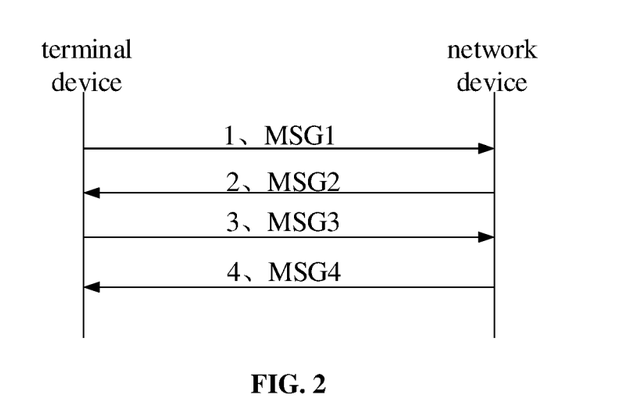
FIG. 2 shows a schematic flowchart of a random access procedure.

For ease of understanding, a four-step random access procedure will be briefly introduced below with reference to FIG. 2. As shown in FIG. 2, the four-step random access procedure mainly includes the following contents:

1. The terminal device sends MSG1 to the network device, that is, sends the preamble. The main purpose is that the network device can correctly estimate the transmission delay of the terminal device and solve the conflict problem when multiple terminal devices simultaneously initiate access requests.

2. The network device sends MSG2, that is, a Random Access Response (RAR), to the terminal device. One RAR can contain response messages to multiple users who send preambles, and the response message to each user contains the Random Access preamble IDentity (RAPID), resource allocation information of MSG3, TA adjustment information, TC-RNTI, and so on. RAR uses Download Control Information (DCI) format 1-0 for scheduling. And, the corresponding Physical Downlink Control Channel (PDCCH) adopts Random Access RNTI (RA-RNTI) for scrambling.

The terminal device descrambles MSG2 using RA-RNTI. The RA-RNTI may be generated according to the following formula:

$$RA\text{-}RNTI = 1 + s\_id + 14 \times t\_id + 14 \times 80 \times f\_id + 14 \times 80 \times 8 \times ul\_carrier\_id \quad \text{(Formula 1)},$$

where s_id is the first Orthogonal Frequency Division Multiplexing (OFDM) symbol of the Physical Random Access Channel (PRACH) resource used for transmitting the preamble (0≤s_id<symbol_number), t_id is an index of the first time slot of the PRACH resource used for transmitting the preamble (0≤t_id<slot_number), f_id is the number of the PRACH resource in the frequency domain (0≤f_id<frequency_number), ul_carrier_id is an uplink carrier used for transmitting the preamble (a value of 0 indicates a normal uplink carrier, a value of 1 indicates a single uplink carrier). The symbol_number is the total possible index number of the starting symbol of the PRACH occasion used in the random access, the slot_number is the total index number of the first slot index in the slots where the PRACH occasion used in the random access is located, and the frequency_number is the total frequency domain index number of the PRACH occasion used for random access.

3. The terminal device sends MSG3, which may include a terminal device identifier C-RNTI.

Uplink transmission usually uses terminal device-specific information, such as C-RNTI, to scramble data part. However, the conflict has not been resolved at this time, and the scrambling cannot be based on C-RNTI and can only use TC-RNTI. In other words, for the data channel in Msg3, the scrambling code can be generated only based on TC-RNTI to perform scrambling.

The initialization value $c_{init}$ of the scrambling code generator is:

$$c_{init} = n_{RNTI} \cdot 2^{15} + n_{ID} \quad \text{(Formula 2)},$$

where $n_{ID} = N_{ID}^{cell}$, corresponding to the initial transmission and retransmission of MSG3. If the higher layer allocates TC-RNTI, $n_{RNTI}$ is TC-RNTI; otherwise, $n_{RNTI}$ is C-RNTI.

4. The network sends MSG4 to the terminal device to send conflict resolution information to the terminal device. So far, the random access procedure will completely solve the conflict problem caused by multiple terminal devices requesting access to the system at the same time.

Figure 3:
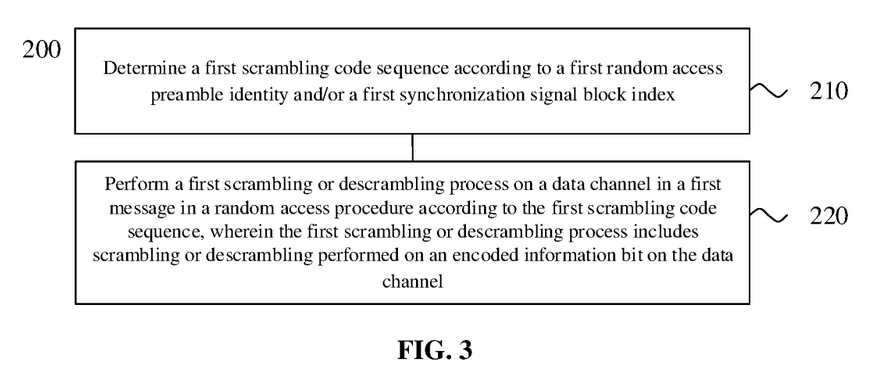
FIG. 3 is a schematic diagram of a random access method according to an embodiment of the present disclosure.

FIG. 3 shows a schematic block diagram of a random access method 200 according to an embodiment of the present disclosure. As shown in FIG. 3, the method 200 is performed by the terminal device or the network device in FIG. 1, and the method 200 includes some or all of the following contents:

In S210, a first scrambling sequence is determined according to a first random access preamble index and/or a first synchronization signal block index.

In S220, a first scrambling or descrambling process is performed on a data channel in a first message in a random access procedure according to the first scrambling sequence. The first scrambling or descrambling process includes scrambling or descrambling performed on an encoded information bit on the data channel.

In order to shorten the time delay of the random access procedure, the four-step random access procedure can be compressed. For example, the new first message (MSG1) can contain the preamble and an uplink data part (for example, carried by the data channel). The uplink data part can carry the identification information of the UE and the reason for the RRC request (that is, contents in the existing MSG3). Since the new MSG1 carries the uplink data part in addition to the preamble, the uplink data part may be carried by a data channel such as a Physical Uplink Shared Channel (PUSCH). Therefore, for the terminal device, the data channel in the first message needs to be scrambled; for network device, the data channel in the first message needs to be descrambled.

It should be understood that generally, the information bits on the data channel are bits obtained after the original bits are encoded, and then after scrambling, the information are carried by the first message and sent to the network device by the UE; or the network device performs descrambling first, and then performs decoding on the descrambled information bits on the data channel to obtain the original bits. That is to say, performing the scrambling or descrambling process on the data channel in the first message refers to performing scrambling or descrambling on the encoded information bits on the data channel.

Specifically, the Radio Resource Control (RRC) on the network side allocates part or all of the index values of the preambles for the contention-based random access and broadcasts the allocated values to a UE through system messages. The PRACH resources required for random access by the UE, such as the number of PRACHs and time-frequency positions, are also broadcast to the UE by the RRC through system messages. After receiving the system messages, the RRC on the UE side parses the preamble information and configures the preamble information to the Media Access Control (MAC). The MAC randomly selects a RAPID from a preamble set according to the path loss and other information and configures the RAPID to the physical layer. According to the RAPID selected by the MAC, the physical layer generates a valid preamble by looking up a table/formula. The UE may determine a scrambling sequence based on the selected RAPID and scramble the aforementioned data channel according to the scrambling sequence. Accordingly, the UE can send the first message to the network, and the first message carries the generated preamble and the scrambled data channel. For the network side, after receiving the first message sent by the UE, the network device can obtain the RAPID selected by the UE. The network device can also determine a scrambling sequence based on the obtained RAPID (the scrambling sequence can be the same as the scrambling sequence determined by the UE), and descramble the data channel carried in the first message according to the scrambling sequence.

According to embodiments, the UE may also determine a scrambling sequence based on the index of a synchronization signal block (Synchronization Signal/Physical Broadcast Channel, Block, SSB) sent by the network device, and descramble the data channel according to the scrambling sequence. Furthermore, the UE can send the first message to the network, and the first message carries the generated preamble and the scrambled data channel. For the network side, after receiving the first message sent by the UE, the network device can also obtain the RAPID selected by the UE from the first message and obtain the UE information from the first message. For example, there is a mapping relationship between the RAPID and the SSB index, and when the network obtains the RAPID selected by the UE, the network device can know the index of the SSB sent by the network to the UE, and thus determine a scrambling sequence based on the SSB index (the scrambling sequence is the same as the scrambling sequence determined by the UE), and descramble the data channel carried in the first message according to the scrambling sequence.

Therefore, in the random access method according to embodiments of the present disclosure, the data channel is carried in the first message in the random access procedure, and scrambling or descrambling is performed on the data channel according to the scrambling sequence generated according to the random access preamble index and/or the synchronization signal block index obtained by the terminal device. In this way, information after the preamble sequence is sent may be put in the first message and sent to the network device along with the first message. Thus, the random access method according to embodiments of the present disclosure is conducive to shortening the delay of the random access procedure.

It should be noted that the method disclosed according to embodiments of the present disclosure can also be directly applied to the third message in the four-step random access procedure, i.e., MSG3. That is to say, in the four-step random access procedure, the network device does not need to allocate TC-RNTI to the terminal device, and MSG3 does not need to be scrambled based on the scrambling sequence generated by TC-RNTI but based on RAPID and/or the scrambling sequence generated by the SSB index.

In embodiments of the present disclosure, determining the first scrambling sequence according to the first random access preamble index and/or the first synchronization signal block index, includes: generating a first Random Access Radio Network Temporary Identifier (RA-RNTI) according to the first random access preamble index and/or the first synchronization signal block index; and according to the first RA-RNTI, generating the first scrambling sequence.

Taking RAPID as an example, the UE may first generate an RA-RNTI based on the selected RAPID, and then generate a scrambling sequence based on the RA-RNTI, and thereby scramble the data channel in the first message. For example, the UE can directly add an independent variable RAPID in Formula 1, thereby obtaining RA-RNTI. That is, formula 1 is transformed into:

$$RA\text{-}RNTI=1+RAP\_id+s\_id+14\times t\_id+14\times 80\times f\_id+14\times 80\times 8\times ul\_carrier\_id,$$

where RAP_id is RAPID. Alternatively, the UE may directly generate RA-RNTI according to RA-RNTI=1+RAP_id. Alternatively, the UE can also add an offset on the basis of 1+RAP_id to generate RA-RNTI. Alternatively, the UE can also generate RA-RNTI by directly performing a mathematical operation on the RAPID (such as a multiple of RAPID). Alternatively, the UE may also determine RA-RNTI based on the selected RAPID and the mapping relationship between RAPID and RA-RNTI. In other words, protocols can specify the mapping relationship between RAPIDs and RA-RNTIs in advance or the network can configure the mapping relationship between RAPIDs and RA-RNTIs in advance. After the UE selects a RAPID, the UE can determine an RA-RNTI directly based on the mapping relationship. After the UE generates RA-RNTI based on the selected RAPID, a scrambling sequence may be further generated, and the scrambling sequence may be generated, for example, by Formula 2, where $n_{RNTI}$ is the generated RA-RNTI. Similarly, the network device can first generate an RA-RNTI based on the RAPID obtained from the first message, and then generate a scrambling sequence based on the RA-RNTI, and thereby descramble the data channel in the first message.

Further, generating the first RA-RNTI according to the first random access preamble index and/or the first synchronization signal block index includes: generating the first RA-RNTI, according to the first random access preamble index and/or the first synchronization signal block index, and information of a Physical Random Access Channel (PRACH) resource used for transmitting a preamble. According to embodiments, the information of the PRACH resource includes at least one of: a first Orthogonal Frequency Division Multiplexing (OFDM) symbol of the PRACH resource used for transmitting the preamble, an index of a first time slot of the PRACH resource used for transmitting the preamble, the number of the PRACH resource used for transmitting the preamble in a frequency domain, and an uplink carrier used for transmitting the preamble.

Taking RAPID as an example, RA-RNTI can be generated by the following formula:

$$RA\text{-}RNTI=1+RAP\_id+preamble\_number\times s\_id+preamble\_number\times symbol\_number\times t\_id+preamble\_number\times symbol\_number\times slot\_number\times f\_id+preamble\_number\times symbol\_number\times slot\_number\times frequency\_number\times ul\_carrier\_id \quad \text{(Formula 3)},$$

where RAP_id is the preamble index of the random access preamble sent by the terminal device, 0≤RAP_id<preamble_number; s_id is the first OFDM symbol of the PRACH resource used for transmitting the preamble (0≤s_id<symbol_number); t_id is the index of the first time slot of the PRACH resource used for transmitting the preamble (0≤t_id<slot_number); fid is the number of the PRACH resource in the frequency domain (0≤f_id<frequency_number); and ul_carrier_id is the uplink carrier used for transmitting the preamble (a value of 0 indicates a normal uplink carrier, and a value of 1 indicates a single uplink carrier).

In addition, the preamble_number is the total number of preambles used in random access on a PRACH occasion. The symbol_number is the total possible index number of the starting symbol of the PRACH occasion used in the random access. The slot_number is the total index number of the first slot index in the slots where the PRACH occasion used in the random access is located. The frequency_number is the total frequency domain index number of the PRACH occasion used for random access.

According to embodiments, the random access procedure in embodiments of the present disclosure may be a two-step random access procedure. That is, MSG1 and MSG3 in the four-step random access procedure are sent from the terminal to the network as the first message, and MSG2 and MSG4 in the four-step random access procedure are sent from the network to the terminal as the second message. The first message may include a preamble and a data channel, and the second message may include a RAR message, conflict resolution information (including a unique identifier of a terminal device generated for the contention), TA adjustment information, C-RNTI, and so on. The second message includes a collection of parts of information similar to MSG2 and MSG4 in the four-step random access procedure. Since the two-step random access procedure has not yet entered the standardization stage, what is listed here is only an example, and does not represent a limitation on the specific definition of the message in the procedure. The definitions of all two-step random access procedures are applicable to this method.

If the random access procedure is a two-step random access procedure, the preamble_number is the total number of preambles used for two-step random access in a PRACH occasion. The symbol_number is the total possible index number of the starting symbol of the PRACH occasion used in the two-step random access, the slot_number is the total number of the first slot index in the slots where the PRACH occasion used in the two-step random access is located, and the frequency_number is the total frequency domain index number of the PRACH occasion used for the two-step random access.

It should be noted that the above Formula 3 is only used as an example, and any modification of formula 3 is within the protection scope of embodiments of the present disclosure, as long as Formula 3 is related to the preamble index, namely RAPID. For example, the RA-RNTI can be generated by the following formula:

RA-RNTI=1+RAP_$id$+preamble_number×$s\_id$+preamble_number×symbol_number×$t\_id$+preamble_number×symbol_number×slot_number×$f\_id$.

When preamble_number=64, symbol_number-14, slot_number-80, and frequency_number=8 in Formula 3, the following equation can be obtained:

RA-RNTI=1+RAPID+64×$s\_id$+64×14×$t\_id$+64×14×80×$f\_id$+64×14×80×8×ul_carrier_$id$.

Of course, preamble_number, symbol_number, slot_number, and frequency_number can also have other values, and all or part of these values are configured by the network device for the terminal or agreed in advance in protocols, or all or part of these values are configured by the network device and agreed in advance in protocols.

Taking SSB index as an example, RA-RNTI can be generated by the following formula:

RA-RNTI=1+SSB_$id$+SSB_number×$s\_id$+SSB_number×symbol_number×$t\_id$+SSB_number×symbol_number×slot_number×$f\_id$+SSB_number×symbol_number×slot_number×frequency_number×ul_carrier_$id$ (Formula 4), where SSB_id is the SSB index sent from the network device to the terminal device, 0≤SSB_id<SSB_number; the SSB_number is the total number of SSBs in a SSB burst set; s_id is the first OFDM symbol of the PRACH resource used for transmitting the preamble (0≤s_id<symbol_number); t_id is the index of the first time slot of the PRACH resource used for transmitting the preamble (0≤t_id<slot_number); fid is the number of the PRACH resource in the frequency domain (0≤f_id<frequency_number); and ul_carrier_id is the uplink carrier used for transmitting the preamble (a value of 0 indicates a normal uplink carrier, and a value of 1 indicates a single uplink carrier). The symbol_number is the total possible index number of the starting symbol of the PRACH occasion used in the random access. The slot_number is the total index number of the first slot index in the slots where the PRACH occasion used in the random access is located. The frequency_number is the total frequency domain index number of the PRACH occasion used for random access.

According to embodiments, the UE may also directly generate RA-RNTI according to 1+SSB_id or add an offset to 1+SSB_id to generate RA-RNTI. Generating RA-RNTI according to the SSB index may refer to generating RA-RNTI according to RAPID. For brevity, repeated descriptions are omitted here.

In embodiments of the present disclosure, the generation of the RA-RNTI may not be related to the RAPID and/or SSB index and may only be related to the information of the PRACH resource used for transmitting the preamble. For example, Formula 1 can be used to generate the RA-RNTI.

In embodiments of the present disclosure, determining the first scrambling sequence according to the first random access preamble index and/or the first synchronization signal block index includes: according to the first random access preamble index and a mapping relationship between preamble indexes and scrambling sequences, and/or the first synchronization signal block index and a mapping relationship between synchronization signal block indexes and scrambling sequences, determining the first scrambling sequence from a scrambling sequence set.

That is to say, the mapping relationship between RAPIDs and the scrambling sequence sets can be pre-arranged in protocols or configured by the network device in advance. For example, assuming that there are RAPIDs 0-63 in total, it can be agreed or configured that RAPID=0 corresponds to a scrambling sequence 0, RAPID=1 corresponds to a scrambling sequence 1, RAPID=2 corresponds to a scrambling sequence 2, . . . RAPID=63 corresponds to a scrambling sequence 63. The UE or the network device can obtain the mapping relationship between the RAPIDs and the scrambling sequences in the scrambling sequence set in advance, and then the UE can determine the corresponding scrambling sequence based on the selected RAPID, or the network device can determine the corresponding scrambling sequence from the scrambling sequence set based on RAPID in MSG1.

The random access procedure in embodiments of the present disclosure may be a two-step random access procedure. In embodiments of the present disclosure, after the network device descrambles the first message, the network device may also scramble a control channel (for example, Physical Downlink Control Channel (PDCCH)) for scheduling the second message in the random access procedure based on the generated RA-RNTI. Similarly, for the terminal device, after the terminal device sends the first message to the network device, the terminal device can descramble the control channel for scheduling the second message in the random access procedure based on the generated RA-RNTI.

According to embodiments, the scrambling or descrambling process on the control channel may further include scrambling or descrambling performed on a Cyclic Redundancy Check (CRC) bit of the control channel.

Since each cell may have multiple available preambles, each terminal device can select one of them for random access and send the selected preamble through PRACH. In the four-step random access procedure, MSG2 may carry RAR messages of multiple terminal devices at most. In the two-step random access procedure, since the second message can include the information in MSG2 and MSG4 in the four-step random access procedure, if the second message still carries response messages for multiple terminal devices, the resource overhead is very large, and the receiving complexity for the terminal device is increased; otherwise, the sending of the message cannot cover the entire cell. Therefore, in the two-step random access procedure, the second message can carry the RAR message for one terminal device. Under such condition, if the method of generating RA-RNTI in the four-step random access procedure is still used, when multiple terminal devices use the same PRACH resource to send their respective preambles, the RA-RNTI determined based on the PRACH resource information is also the same, and it is impossible to distinguish different second messages that the network device sends in response to these terminal devices.

Therefore, embodiments of the present disclosure provide that network device and terminal device can generate RA-RNT based on RAPID or a synchronous signal block (SSB or SS Block) index and use the RA-RNT to scramble or descramble the control channel for scheduling the second message in the two-step procedure. For different terminal devices, the selected RAPID and the corresponding SSB index may vary, and thus for terminal devices that use different preambles for random access, the generated RA-RNTIs used to scramble or descramble the control channel can also be different. Therefore, the second message(s) that the network device sends in response to different terminal devices can be identified, and the effective transmission of the second message in the two-step random access procedure is realized.

It should be noted that if the terminal device scrambles the data channel in the first message by using the scrambling sequence generated by RA-RNTI, the terminal device can directly use the RA-RNTI to descramble the control channel for scheduling the second message, and the RA-RNTI may be generated based on the RAPID and/or SSB index. If the terminal device scrambles the data channel in the first message by using the scrambling sequence obtained from the mapping relationship, the terminal device needs to generate RA-RNTI based on the RAPID and/or SSB index, and then descrambles the control channel for scheduling the second message according to the generated RA-RNTI. Similarly, if the network device descrambles the data channel in the first message by using the scrambling sequence generated by RA-RNTI, the network device can directly use the RA-RNTI to scramble the control channel for scheduling the second message. The RA-RNTI can be generated based on the RAPID and/or SSB index. If the network device descrambles the data channel in the first message by using the scrambling sequence obtained from the mapping relationship, the network device needs to generate RA-RNTI based on RAPID and/or SSB index, and then scrambles the control channel for scheduling the second message according to the generated RA-RNTI.

The scrambling or descrambling of the control channel used to schedule the second message in embodiments of the present disclosure may use the RA-RNTI generated in the four-step random access procedure, and identification information (such as RAPID) of terminal devices may be carried in the second message to distinguish different terminals.

In embodiments of the present disclosure, there is a mapping relationship between the preamble sequence carried in the first message and the data channel. That is, if the network device obtains the preamble sequence in the first message, the network device can determine the information (for example, resource position) of the data channel corresponding to the preamble sequence.

It should be understood that the method 200 according to embodiments of the present disclosure can be performed by a terminal device or a network device. The terminal device scrambles the data channel in the first message and sends the first message to the network device. The network device descrambles the data channel in the first message, then scrambles the control channel used to schedule the second message and sends the second message to the terminal device. After receiving the second message, the terminal descrambles the control channel used to schedule the second message.

It should be understood that in various embodiments of the present disclosure, the sequence number of the above-mentioned processes does not mean the order of execution. The execution order of processes should be determined by their functions and internal logic, and the execution order described herein should not be construed as constituting any limitation on the present disclosure.

The random access method according to embodiments of the present disclosure is described in detail above, and the random access device according to embodiments of the present disclosure will be described below with reference to FIG. 4 to FIG. 5. The technical features described in the method embodiments are applicable to the device embodiments.

Figure 4:
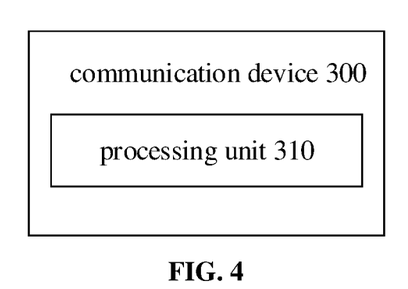
FIG. 4 is a schematic block diagram of a communication device according to an embodiment of the present disclosure.

FIG. 4 shows a schematic block diagram of a communication device 300 according to an embodiment of the present disclosure. As shown in FIG. 4, the communication device 300 includes a processing unit 310.

The processing unit 310 is configured to: determine a first scrambling sequence according to a first random access preamble index and/or a first synchronization signal block index; and perform a first scrambling or descrambling process on a data channel in a first message in a random access procedure according to the first scrambling sequence, wherein the first scrambling or descrambling process includes scrambling or descrambling performed on an encoded information bit on the data channel.

According to embodiments of the present disclosure, the processing unit is configured to generate a first Random Access Radio Network Temporary Identifier (RA-RNTI) according to the first random access preamble index and/or the first synchronization signal block index; and according to the first RA-RNTI, generate the first scrambling sequence.

According to embodiments of the present disclosure, generating the first RA-RNTI by the processing unit according to the first random access preamble index and/or the first synchronization signal block index includes generating the first RA-RNTI, according to the first random access preamble index and/or the first synchronization signal block index, and information of a Physical Random Access Channel (PRACH) resource used for transmitting a preamble.

According to embodiments of the present disclosure, the information of the PRACH resource includes at least one of a first Orthogonal Frequency Division Multiplex (OFDM) symbol of the PRACH resource used for transmitting the preamble, an index of a first time slot of the PRACH resource used for transmitting the preamble, a number of the PRACH resource used for transmitting the preamble in a frequency domain, and an uplink carrier where the preamble is.

According to embodiments of the present disclosure, the processing unit is configured to according to the first random access preamble index and a mapping relationship between preamble indexes and scrambling sequences, and/or the first synchronization signal block index and a mapping relationship between synchronization signal block indexes and scrambling sequences, determine the first scrambling sequence from a scrambling sequence set.

According to embodiments of the present disclosure, the processing unit is further configured to according to the first RA-RNTI, perform a second scrambling or descrambling process on a control channel for scheduling a second message in the random access procedure.

According to embodiments of the present disclosure, the processing unit is further configured to generate a first Random Access Radio Network Temporary Identifier (RA-RNTI) according to the first random access preamble index and/or the first synchronization signal block index; and according to the first RA-RNTI, perform a second scrambling or descrambling process on a control channel for scheduling a second message in the random access procedure.

According to embodiments of the present disclosure, the second scrambling or descrambling process includes scrambling or descrambling performed on a Cyclic Redundancy Check (CRC) bit of the control channel.

According to embodiments of the present disclosure, the communication device is a terminal device, and the processing unit is further configured to determine the first random access preamble index from a random access preamble set.

According to embodiments of the present disclosure, the communication device is a network device, and the processing unit is further configured to obtain the first random access preamble index from the first message.

According to embodiments of the present disclosure, the first message further includes a preamble sequence identified by the first random access preamble index, and there is a mapping relationship between the preamble sequence and the data channel.

According to embodiments of the present disclosure, the random access procedure is a two-step random access procedure.

It should be understood that the communication device 300 according to embodiments of the present disclosure can be used to perform the method embodiments of the present disclosure, and the above and other operations and/or functions of each unit in the communication device 300 are used to implement the corresponding process in the method in FIG. 2. For brevity, repeated descriptions are omitted here.

Figure 5:
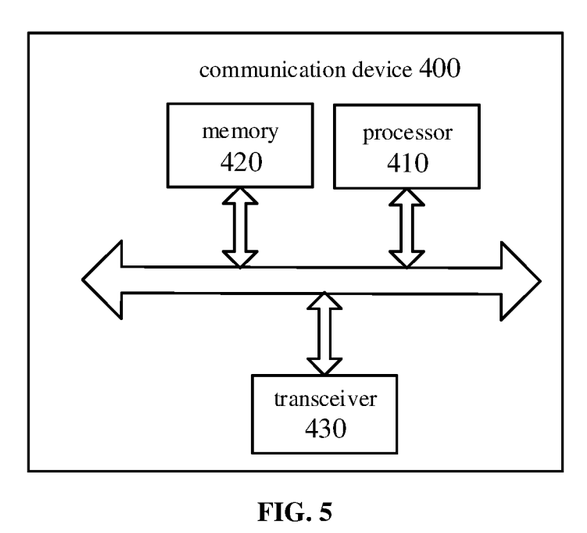
FIG. 5 is another schematic block diagram of a communication device according to an embodiment of the present disclosure.

As shown in FIG. 5, an embodiment of the present disclosure provides a communication device 400. The communication device 400 may be the communication device 300 in FIG. 4, which can be used to perform the processes corresponding to the method 200 in FIG. 2. The communication device 400 shown in FIG. 5 includes a processor 410, and the processor 410 can call and run a computer program from a memory to perform the methods embodiments of the present disclosure.

According to embodiments, as shown in FIG. 5, the communication device 400 may further include a memory 420. The processor 410 may call and run a computer program from the memory 420 to perform the methods embodiments of the present disclosure.

The memory 420 may be a separate device independent of the processor 410 or may be integrated into the processor 410.

According to embodiments, as shown in FIG. 5, the communication device 400 may further include a transceiver 430, and the processor 410 may control the transceiver 430 to communicate with other devices. Specifically, the transceiver may send information or data to other devices, or receive information or data sent by other devices.

The transceiver 430 may include a transmitter and a receiver. The transceiver 430 may further include one or more antennas.

According to embodiments, the communication device 400 may be a communication device in embodiments of the present disclosure, and the communication device 400 may implement corresponding processes implemented by the communication device in each method embodiments of the present disclosure. For brevity, repeated descriptions are omitted here.

In a specific implementation, the processing unit in the communication device 400 may be implemented by the processor 410 in FIG. 5, and the sending unit in the communication device 400 may be implemented by the transceiver 430 in FIG. 5.

According to embodiments, the communication device 400 may be a terminal device or a network device.

Figure 6:
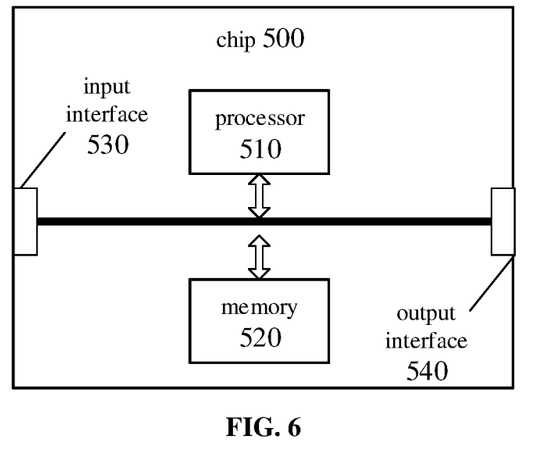
FIG. 6 is a schematic block diagram of a chip according to an embodiment of the present disclosure.

FIG. 6 is a schematic structural diagram of a chip according to an embodiment of the present disclosure. The chip 500 shown in FIG. 6 includes a processor 510, and the processor 510 can call and run a computer program from a memory to perform the method embodiments of the present disclosure.

According to embodiments, as shown in FIG. 6, the chip 500 may further include a memory 520. The processor 510 may call and run a computer program from the memory 520 to perform the method embodiments of the present disclosure.

The memory 520 may be a separate device independent of the processor 510 or may be integrated in the processor 510.

According to embodiments, the chip 500 may further include an input interface 530. The processor 510 can control the input interface 530 to communicate with other devices or chips. Specifically, the input interface can obtain information or data sent by other devices or chips.

According to embodiments, the chip 500 may further include an output interface 540. The processor 510 can control the output interface 540 to communicate with other devices or chips. Specifically, the output interface can output information or data to other devices or chips.

According to embodiments, the chip can be applied to the network device in embodiments of the present disclosure, and the chip can implement the corresponding process implemented by the network device in each method embodiments of the present disclosure. For brevity, repeated descriptions are omitted here.

According to embodiments, the chip can be applied to the terminal device in embodiments of the present disclosure, and the chip can implement the corresponding process implemented by the terminal device in each method embodiments of the present disclosure. For brevity, repeated descriptions are omitted here.

It should be understood that the chip mentioned in embodiments of the present disclosure may also be referred to as a system-level chip, a system chip, a chip system, or a system-on-chip, and so on.

Figure 7:
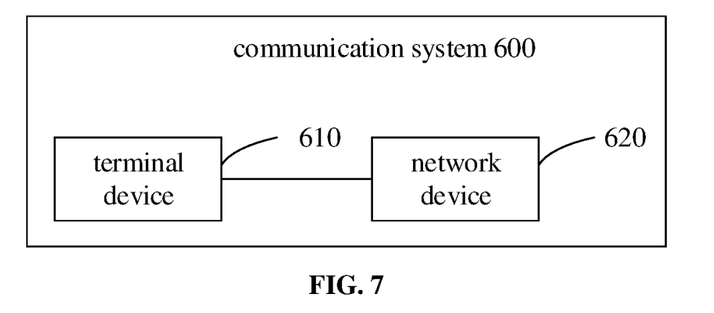
FIG. 7 is a schematic block diagram of a communication system according to an embodiment of the present disclosure.

FIG. 7 is a schematic block diagram of a communication system 600 according to an embodiment of the present disclosure. As shown in FIG. 7, the communication system 600 includes a terminal device 610 and a network device 620.

Both the terminal device 610 and the network device 620 can be used to implement the corresponding functions implemented by the communication device in the foregoing methods, and for brevity, repeated descriptions are omitted here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the terminal device in embodiments of the present disclosure, and when the computer program runs on a computer, the computer is caused to perform the corresponding processes implemented by the terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices, and units can be found in the previous description regarding the method embodiments.

In the embodiments provided in the present disclosure, it should be understood that the disclosed systems, devices, and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical, or other forms.

The units described as separate parts may or may not be physically separated, and the parts displayed as units may or may not be physical units. That is, the units may be located in one place, or may be distributed over multiple network units. Some or all of the units may be selected according to actual needs to achieve the objectives of the solutions in the embodiments.

In addition, the functional units in the embodiments of the present disclosure may be integrated into one processing unit, or the units may exist alone physically, or two or more units may be integrated into one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A method for random access, comprising:
calculating, in a two-step random access procedure, a first scrambling sequence using a first random access preamble index of the two-step random access procedure according to a preset formula; and
performing a first scrambling or descrambling process on a data channel in a first message in a random access procedure according to the first scrambling sequence, wherein the first scrambling or descrambling process comprises scrambling or descrambling performed on an encoded information bit on the data channel,
wherein the first message further comprises a preamble sequence identified by the first random access preamble index, and there is a mapping relationship between the preamble sequence and the data channel,
wherein the preamble sequence corresponds to a resource position of the data channel, and
wherein calculating, in a two-step random access procedure, a first scrambling sequence using a first random access preamble index of the two-step random access procedure according to a preset formula comprises:
generating a random access radio network temporary identifier by using the first random access preamble index according to a formula of RA-RNTI=1+RAP_id+s_id+14×t_id+14×80×f_id+14×80×8×ul_carrier_id, where RA-RNTI indicates the random access radio network temporary identifier, RAP_id indicates the first random access preamble index, s_id indicates a first Orthogonal Frequency Division Multiplexing OFDM symbol of a Physical Random Access Channel PRACH resource used for transmitting a preamble related to the first random access preamble index, t_id indicates an index of a first time slot of the PRACH resource, f_id indicates a number of the PRACH resource in frequency domain, and ul_carrier_id indicates an uplink carrier used for transmitting the preamble; and
generating the first scrambling sequence by using the random access radio network temporary identifier.

2. The method according to claim 1, wherein the method is performed by a terminal device, and the method further comprises:
determining the first random access preamble index from a random access preamble set.

3. The method according to claim 1, wherein the method is performed by a network device, and the first message comprises a preamble and the data channel.

4. The method according to claim 3, wherein the preamble is related to the first random access preamble index.

5. A communication device, comprising:
a processor; and
a memory;
wherein the memory is configured to store a computer program, and the processor is configured to call and run the computer program stored in the memory to:
calculate, in a two-step random access procedure, a first scrambling sequence using a first random access preamble index of the two-step random access procedure according to a preset formula; and
perform a first scrambling or descrambling process on a data channel in a first message in a random access procedure according to the first scrambling sequence, wherein the first scrambling or descrambling process comprises scrambling or descrambling performed on an encoded information bit on the data channel, and
wherein the first message further comprises a preamble sequence identified by the first random access preamble index, and there is a mapping relationship between the preamble sequence and the data channel,
wherein the preamble sequence corresponds to a resource position of the data channel, and
wherein the processor is configured to:
generate a random access radio network temporary identifier by using the first random access preamble index according to a formula of RA-RNTI=1+RAP_id+s_id+14×t_id+14×80×f_id+14×80×8×ul_carrier_id, where RA-RNTI indicates the random access radio network temporary identifier, RAP_id indicates the first random access preamble index, s_id indicates a first Orthogonal Frequency Division Multiplexing OFDM symbol of a Physical Random Access Channel PRACH resource used for transmitting a preamble related to the first random access preamble index, t_id indicates an index of a first time slot of the PRACH resource, f_id indicates a number of the PRACH resource in frequency domain, and ul_carrier_id indicates an uplink carrier used for transmitting the preamble; and
generate the first scrambling sequence by using the random access radio network temporary identifier.

6. The communication device according to claim 5, wherein the communication device is a terminal device, and the processor is further configured to:
determine the first random access preamble index from a random access preamble set.

7. The communication device according to claim 5, wherein the communication device is a network device, and the first message comprises a preamble and the data channel.

8. The communication device according to claim 7, wherein the preamble is related to the first random access preamble index.

* * * * *